US010164221B2

(12) United States Patent
Lim

(10) Patent No.: US 10,164,221 B2
(45) Date of Patent: Dec. 25, 2018

(54) SECONDARY BATTERY

(71) Applicant: Samsung SDI Co., Ltd., Yongin-si, Gyeonggi-do (KR)

(72) Inventor: Byungho Lim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 441 days.

(21) Appl. No.: 14/936,387

(22) Filed: Nov. 9, 2015

(65) Prior Publication Data
US 2016/0133886 A1 May 12, 2016

(30) Foreign Application Priority Data

Nov. 12, 2014 (KR) .................... 10-2014-0157012

(51) Int. Cl.
*H01M 2/04* (2006.01)
*H01M 2/30* (2006.01)
*H01M 2/06* (2006.01)
*H01M 2/22* (2006.01)
*H01M 2/02* (2006.01)
*H01M 10/052* (2010.01)

(52) U.S. Cl.
CPC .......... *H01M 2/0404* (2013.01); *H01M 2/06* (2013.01); *H01M 2/22* (2013.01); *H01M 2/30* (2013.01); *H01M 2/0217* (2013.01); *H01M 10/052* (2013.01); *H01M 2220/30* (2013.01)

(58) Field of Classification Search
CPC ........ H01M 2/0404; H01M 2/06; H01M 2/22; H01M 2/30; H01M 2/0217; H01M 2220/30
See application file for complete search history.

(56) References Cited

U.S. PATENT DOCUMENTS

2009/0061306 A1   3/2009 Uh
2013/0089760 A1*  4/2013 Kim ................... H01M 2/30
                                                     429/61

FOREIGN PATENT DOCUMENTS

KR   10-2006-0037837 A   5/2006
KR      10-0880325 B1    1/2009
KR   10-2012-0110208 A  10/2012

* cited by examiner

Primary Examiner — Ula C Ruddock
Assistant Examiner — Thomas H. Parsons
(74) Attorney, Agent, or Firm — Knobbe, Martens, Olson & Bear, LLP

(57) ABSTRACT

A secondary battery is disclosed. In one aspect, the secondary battery includes an electrode assembly, a case having an opening and housing the electrode assembly and a cap assembly sealing the opening of the case. The cap assembly includes an electrode terminal electrically connected to the electrode assembly. The cap assembly also includes a cap plate including a first terminal hole into which the electrode terminal is inserted and a coupling groove extending from a lateral surface of the cap plate past the first terminal hole. The coupling groove has an open side facing the electrode assembly. The cap assembly further includes an insulation member connected to the cap plate via the inside of the coupling groove and configured to be slidably engaged with the coupling groove.

11 Claims, 9 Drawing Sheets

SECONDARY BATTERY

CROSS-REFERENCE TO RELATED APPLICATION

This application claims priority from Korean Patent Application No. 10-2014-0157012 filed on Nov. 12, 2014 in the Korean Intellectual Property Office, and all the benefits accruing therefrom under 35 U.S.C. 119, the contents of which in its entirety are herein incorporated by reference.

BACKGROUND

Field

The described technology generally relates to a secondary battery.

Description of the Related Technology

The demand for secondary batteries which are used as energy sources is increasing in step with the technical development and demand for mobile devices. Accordingly, improvements to the life cycle, capacity and safety characteristics for secondary batteries have been undergoing development.

Secondary batteries can be classified into cylindrical or prismatic batteries having an electrode assembly housed in a cylindrical or prismatic metal can and pouch-type batteries having an electrode assembly housed in a pouch case.

SUMMARY OF CERTAIN INVENTIVE ASPECTS

One inventive aspect is a secondary battery having an increased amount of injected electrolyte solution or size of electrode assembly by providing a sufficiently large inner space within a case. This can improve safety reduces the possibility of electrical short circuits by permitting the installation of a lead tab and an electrode terminal that are separated from each other.

The above and other aspects of the described technology will be described in or be apparent from the following description of certain inventive aspects.

Another aspect is a secondary battery including an electrode assembly; a case accommodating the electrode assembly; and a cap assembly sealing an opening of the case, wherein the cap assembly includes an electrode terminal electrically connected to the electrode assembly; a cap plate including a first terminal hole into which the electrode terminal is inserted and a coupling groove led to a position passing the first terminal hole and opened toward the electrode assembly; and an insulation member connected to the inside of the coupling groove in a slidable manner.

In addition, stepped grooves each having a predetermined depth along the coupling groove may be formed on opposite lateral surfaces of the coupling groove.

A protrusion inserted into each of the stepped grooves may be formed on a lateral surface of the insulation member.

A second terminal hole which corresponds to the first terminal hole and into which the electrode terminal is inserted may be formed in the insulation member.

The electrode terminal may include a terminal pin inserted into the first terminal hole and a terminal plate connected to one side of the terminal pin and electrically connected to the electrode assembly.

The terminal plate may be positioned outside the insulation member.

The insulation member may include a receiving groove corresponding to the terminal plate and the terminal plate may be inserted into the receiving groove to then be positioned inside the insulation member.

The cap plate and the case may be connected to each other such that a lateral portion of the cap plate and an internal top end of the case are welded to each other.

The electrode assembly may include a first electrode plate including a first electrode current collector having a first electrode active material coated on at least one surface and a plurality of first lead tabs extending from the first electrode current collector and protruding toward the cap assembly, a second electrode plate including a second electrode current collector having a second electrode active material coated on at least one surface and a plurality of second lead tabs extending from the second electrode current collector and protruding toward the cap assembly, and a separator interposed between the first electrode plate and the second electrode plate. Here, at least one of the first lead tabs and the second lead tabs are electrically connected to the electrode terminal.

Another aspect is a secondary battery, comprising an electrode assembly; a case having an opening and housing the electrode assembly; and a cap assembly sealing the opening of the case, wherein the cap assembly comprises: an electrode terminal electrically connected to the electrode assembly; a cap plate including: i) a first terminal hole into which the electrode terminal is inserted and ii) a coupling groove extending from a lateral surface of the cap plate past the first terminal hole, wherein the coupling groove has an open side facing the electrode assembly; and an insulation member connected to the cap plate via the inside of the coupling groove and configured to be slidably engaged with the coupling groove.

In example embodiments, the coupling groove comprises a pair of stepped grooves formed on opposing lateral surfaces of the coupling groove. The insulation member can comprise a pair of protrusions formed on opposing lateral surfaces of the insulation member and the protrusions can be configured to be inserted into the stepped grooves. The insulating member can comprise a second terminal hole which corresponds to the first terminal hole and into which the electrode terminal is inserted.

In example embodiments, the electrode terminal comprises a terminal pin inserted into the first terminal hole and a terminal plate connected to one end of the terminal pin and electrically connected to the electrode assembly. The terminal plate can be positioned outside the insulation member. The insulation member can include a receiving groove corresponding to the terminal plate and wherein the terminal plate is inserted into the receiving groove so as to be positioned inside the insulation member. A lateral portion of the cap plate and an internal top end of the case can be welded to each other.

In example embodiments, the electrode assembly comprises a first electrode plate including: i) a first electrode current collector having a first electrode active material coated on at least one surface thereof and ii) a plurality of first lead tabs extending from the first electrode current collector and protruding toward the cap assembly; a second electrode plate including: i) a second electrode current collector having a second electrode active material coated on at least one surface thereof and ii) a plurality of second lead tabs extending from the second electrode current collector and protruding toward the cap assembly; and a separator interposed between the first electrode plate and the second electrode plate, wherein at least one of the first lead tabs and the second lead tabs are electrically connected to the electrode terminal.

As described above, in the secondary battery according to the described technology, an amount of an electrolyte solution injected or a size of an electrode assembly can be increased by securing a sufficiently large inner space of a case and safety can be improved by reducing a possibility of electrical short circuits by separately installing a lead tab and an electrode terminal from each other.

BRIEF DESCRIPTION OF THE DRAWINGS

The above and other features and advantages of the described technology will become more apparent by describing in detail embodiments thereof with reference to the attached drawings in which.

DETAILED DESCRIPTION OF CERTAIN INVENTIVE EMBODIMENTS

In cylindrical or prismatic batteries, the components of a cap assembly occupy a considerable amount of space in the case, thus reducing the amount of space available for the electrolyte and/or the electrode assembly. This lowers battery life cycle or capacity properties.

In addition, while a lead tab drawn from an electrode assembly and an electrode terminal of a cap assembly are generally connected to each other via welding, the lead tab can become separated from the electrode terminal due to external shocks. In this situation, there is a high probability of electrical short circuits due to a contact between the lead tab and other components of the secondary battery having a differing polarity.

Figure 1:
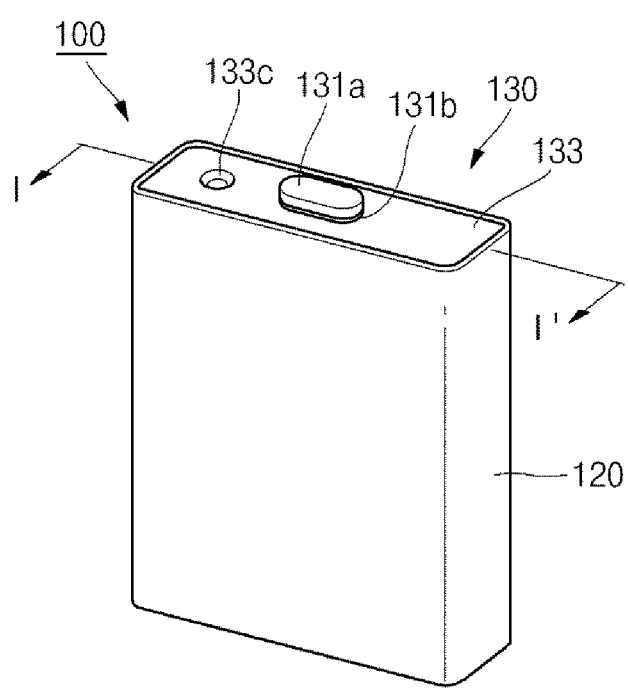
FIG. 1 is a perspective view of a secondary battery according to an embodiment.
Figure 2:
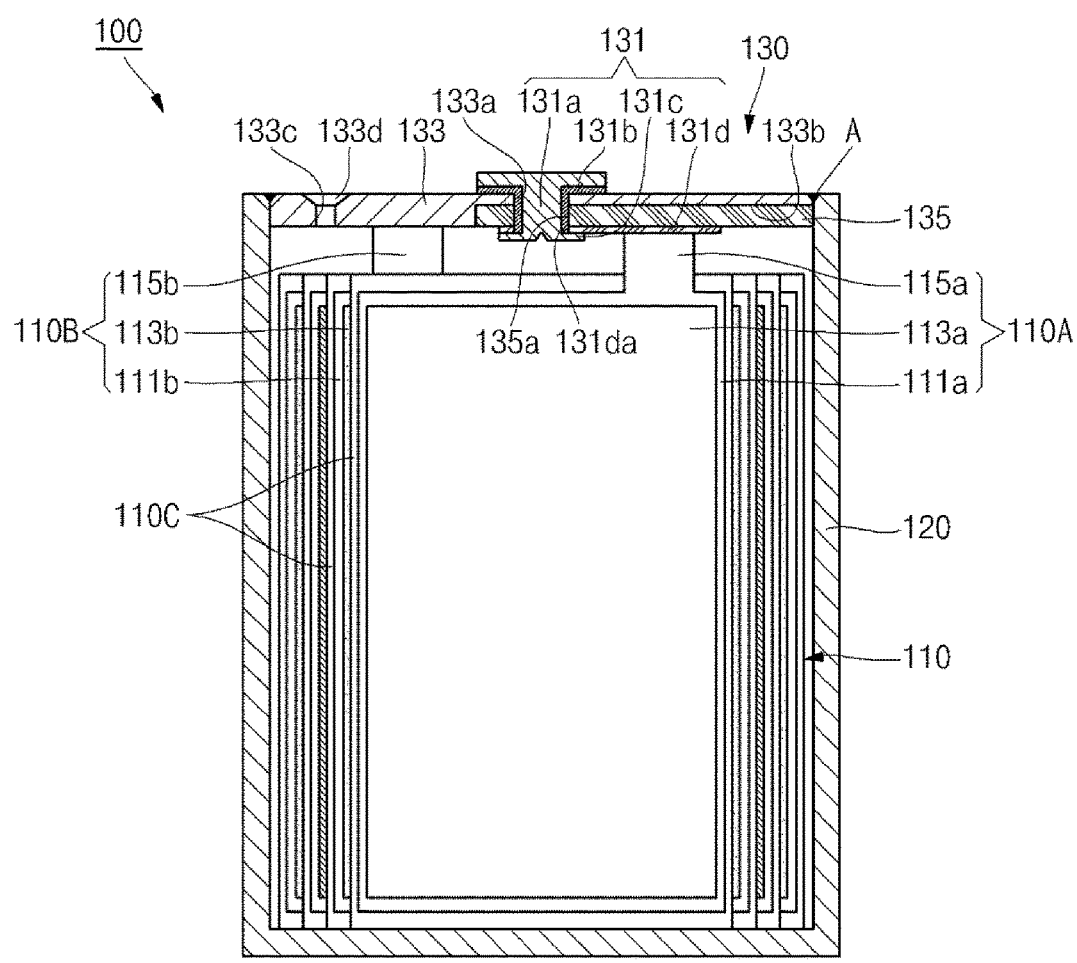
FIG. 2 is a cross-sectional view of the secondary battery, taken along the line I-I' of FIG. 1.
Figure 3A:
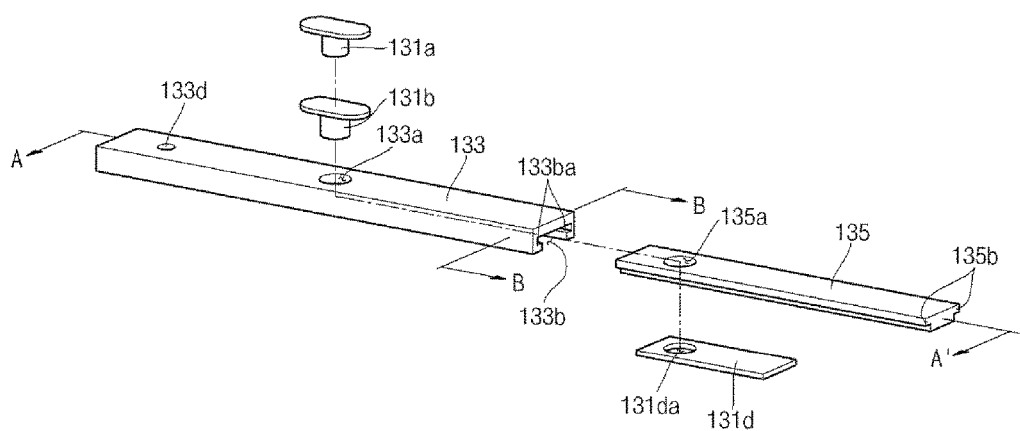
FIG. 3A is an exploded perspective view of a cap assembly according to an embodiment.
Figure 3B:
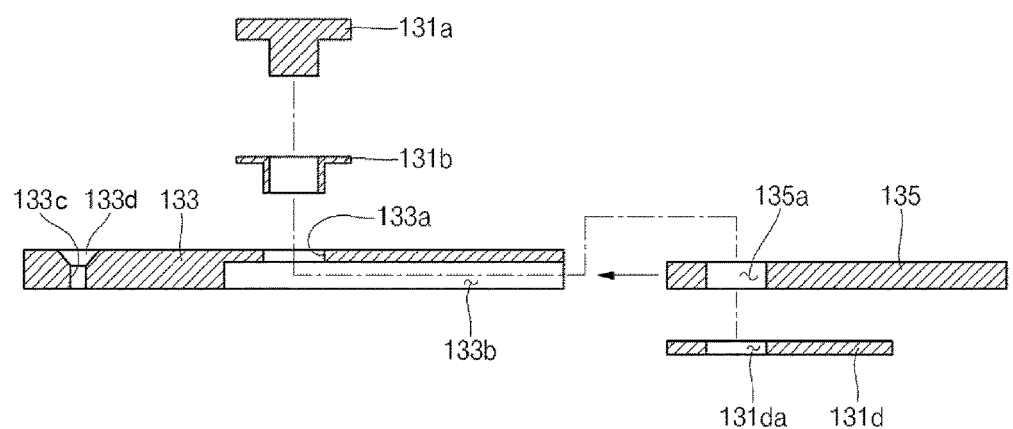
FIG. 3B is a cross-sectional view taken along the line A-A' of FIG. 3A.
Figure 3C:
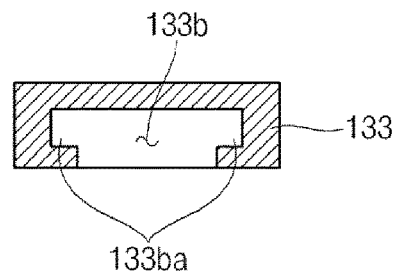
FIG. 3C is a cross-sectional view taken along the line B-B' of FIG. 3A.

Hereinafter, a secondary battery according to an embodiment will be described with reference to the accompanying drawings. FIG. 1 is a perspective view of a secondary battery according to an embodiment. FIG. 2 is a cross-sectional view of the secondary battery, taken along the line I-I' of FIG. 1. FIG. 3A is an exploded perspective view of a cap assembly according to an embodiment. FIG. 3B is a cross-sectional view taken along the line A-A' of FIG. 3A. FIG. 3C is a cross-sectional view taken along the line B-B' of FIG. 3A.

Referring to FIGS. 1 to 3C, the secondary battery 100 according to an embodiment includes an electrode assembly 110, a case 120 and a cap assembly 130.

The electrode assembly 110 includes a first electrode plate 110A, a second electrode plate 110B and a separator 110C, which are thin plates or thin layers. The first electrode plate 110A may function as a negative electrode and the second electrode plate 110B may function as a positive electrode, and vice versa.

The first electrode plate 110A may include a first electrode current collector 111$a$ having a first electrode active material 113$a$ coated on at least one surface thereof and a plurality of first lead tabs 115$a$ extending from the first electrode current collector 111$a$.

In some embodiments, the first electrode current collector 111$a$ is formed of a metal foil made of, for example, nickel or copper. The first electrode active material 113$a$ may include graphite or carbon, but aspects of the described technology are not limited thereto. The first lead tabs 115$a$ where the first electrode active material 113$a$ is not applied extend from the first electrode current collector 111$a$ to protrude toward the cap assembly 130. The first lead tabs 115$a$ are aligned at a predetermined position to establish a multi-tab configuration when the first lead tabs 115$a$ are wound for forming the electrode assembly 110. The first lead tabs 115$a$ function as a passage or current path for current flowing between the first electrode plate 110A and an electrode terminal 131 of the cap assembly 130.

The second electrode plate 110B includes a second electrode current collector 111$b$ having a second electrode active material 113$b$ coated on at least one surface thereof and a plurality of second lead tabs 115$b$ extending from the second electrode current collector 111$b$.

In some embodiments, the second electrode current collector 111$b$ is formed of a metal foil made of, for example, aluminum. The second electrode active material 113$b$ may include a transition metal oxide, but aspects of the described technology are not limited thereto. The second lead tabs 115$b$ where the second electrode active material 113$b$ is not applied extends from the second electrode current collector 111$b$ to protrude toward the cap assembly 130. The second lead tabs 115$b$ are aligned at a predetermined position to establish a multi-tab configuration when the second lead tabs 115$b$ are wound for forming the electrode assembly 110. The second lead tabs 115$b$ are welded to a bottom surface of a cap plate 133 and function as a passage or current path for current flowing between the second electrode plate 110B and the cap plate 133.

The separator 110C is positioned between the first electrode plate 110A and the second electrode plate 110B to prevent electrical short circuits and to allow for the movement of flowable ions, such as lithium ions. The separator 110C may be formed of one or more of the following materials: polyethylene (PE) or polypropylene (PP), but aspects of the described technology are not limited thereto.

The separator 110C has a larger width than the first or second electrode plate 110A or 110B and protrudes upward and downward from the electrode assembly 110 farther than the first and second electrode plates 110A and 110B. Here, the expression "upward from the electrode assembly 110" is used generally to refer a direction facing the cap assembly 130 and the expression "downward from the electrode assembly 110" is used generally to refer a direction facing a bottom surface of the case 120. Accordingly, the separator 110C can prevent unnecessary electrical short circuits from occurring between the electrode assembly 110 and the interior side of the case 120 due to upward and/or downward movement of the electrode assembly 110.

In some embodiments, the case 120 has an approximately hexahedral shape with a top opening such that the electrode assembly 110 is inserted and placed in the case 120. The case 120 may be formed of a conductive metal, such as aluminum, an aluminum alloy, or nickel-plated steel, but aspects of the described technology are not limited thereto. The inner surface of the case 120 may be subjected to an insulation treatment, such that the case 120 is insulated from the electrode assembly 110.

An electrolyte solution (not shown) and the electrode assembly 110 are accommodated in the case 120. The electrolyte solution serves as a medium which enables to movement of lithium ions generated by an electrochemical reaction taking place in the first and second electrode plates 110A and 110B during charging and discharging of the secondary battery 100. The electrolyte solution may be a non-aqueous organic electrolyte solution that is a mixture including a lithium salt and a high-purity organic solvent. In addition, the electrolyte solution may be a polymer using a polymer electrolyte.

The cap assembly 130 may include an electrode terminal 131, the cap plate 133 and an insulation member 135.

The electrode terminal 131 can electrically connect the electrode assembly 110 to external polarity elements. The electrode terminal 131 includes a terminal pin 131a, a seal gasket 131b and a terminal plate 131d.

The terminal pin 131a is inserted into a first terminal hole 133a formed in the cap plate 133, which will be described later, to then be fixed to the cap plate 133 while passing through the cap plate 133 from the top portion to the bottom portion of the cap plate 133.

The seal gasket 131b seals the first terminal hole 133a into which the terminal pin 131a is inserted and is formed of an electrically insulating material to electrically insulate the terminal pin 131a and the cap plate 133 from each other.

The terminal plate 131d has a bottom end of the terminal pin 131a riveted around a third terminal hole 131da of the terminal plate 131d to be formed as a riveting part engaged with the terminal plate 131d and is electrically connected to the first lead tabs 115a via welding. Here, the bottom end of the terminal pin 131a generally refers to a portion inserted into the interior side of the case 120 through the first terminal hole 133a.

The cap plate 133 may be a metal plate sized and shaped to correspond to the top opening of the case 120 and seals the top opening of the case 120. The cap plate 133 is connected to the case 120 such that a lateral portion of the cap plate 133 and an internal top end of the case 120 are welded to each other at a contact portion A. The cap plate 133 and the case 120 may be formed of the same material, but aspects of the described technology are not limited thereto.

The cap plate 133 includes the first terminal hole 133a, a coupling groove 133b and an electrolyte injection hole 133c.

The terminal pin 131a is inserted into the first terminal hole 133a to pass through the cap plate 133 from the top portion to the bottom portion thereof. The first terminal hole 133a is formed at the center of the cap plate 133.

The coupling groove 133b is a space where the insulation member 135 is inserted in a slidable manner and is connected thereto. The coupling groove 133b is formed to such that it can be inserted from a lateral surface of the cap plate 133 to a position passing the first terminal hole 133a. For example, the coupling groove 133b extends from the lateral surface of the cap plate past the first terminal hole 133a. The coupling groove 133b is configured such that one surface thereof is opened to expose the insulation member 135 toward the electrode assembly 110 and a lateral surface thereof is opened to allow the insulation member 135 to be slidably inserted into the cap plate 133. As shown in FIGS. 3A and 3C, stepped grooves 133ba each having a predetermined depth along the coupling groove 133b are formed on opposite lateral surfaces of the coupling groove 133b.

The electrolyte injection hole 133c is formed for injecting an electrolyte solution into the case 120 and is sealed by a plug 133d.

The insulation member 135 is sized and shaped to correspond to the coupling groove 133b and 135 and is inserted into the coupling groove 133b in a slidable manner to then be connected thereto.

The insulation member 135 includes a second terminal hole 135a and a protrusion 135b. The second terminal hole 135a is formed at a position corresponding to the first terminal hole 133a and the third terminal hole 131da, and the terminal pin 131a passes through the second terminal hole 135a. Accordingly, the electrode terminal 131 is connected to the cap plate 133a through the first terminal hole 133a and is tightly connected to the insulation member 135 through the second terminal hole 135a.

The protrusion 135b is formed on each of the opposite lateral surfaces of the stepped groove 133ba and is sized to correspond to the insulation member 135. When the protrusion 135b is inserted into the stepped groove 133ba, it serves as a locking member to more tightly connect the insulation member 135 to the coupling groove 133b. In addition, the protrusion 135b serves as a guide member to allow the insulation member 135 to be inserted into the coupling groove 133b in a slidable manner.

According to an embodiment, since the insulation member connected to the electrode terminal is positioned inside the cap plate, the amount of space occupied by the insulation member in the case can be reduced, compared to the traditional insulation member. Accordingly, the amount of electrolyte solution injected into the case can be increased by the reduction in space occupied by the insulation member, and thus, the life cycle of the secondary battery can be improved.

In addition, since the insulation member according to an embodiment has an increased length with respect to the traditional insulation member, the insulating area of the cap plate can be increased. As such, since the probability of generating electrical short circuits due to contact between the lead tab and the cap plate is reduced, the safety of the secondary battery is improved.

Further, since the insulation member is connected to the interior side of the cap plate in a slidable manner, a connecting force between the insulation member and the cap plate can be increased.

Figure 4:
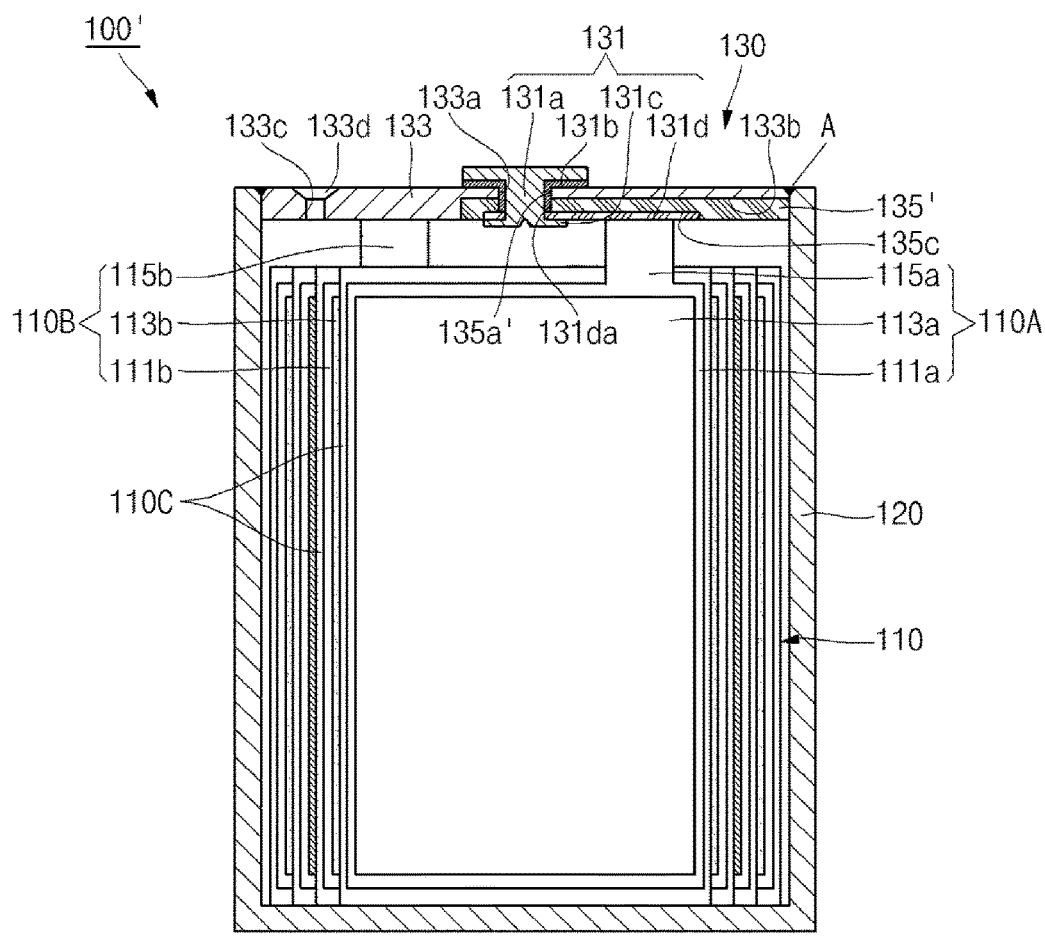
FIG. 4 is a diagram illustrating a modified example of the insulation member shown in FIG. 2.

FIG. 4 is a diagram illustrating a modified example of the insulation member shown in FIG. 2.

Since the exposed surface of the insulation member 135 shown in FIG. 2, that is, a surface corresponding to the terminal plate 131d, is planar, the terminal plate 131d is positioned outside the insulation member 135. By contrast, the terminal plate 131d shown in FIG. 4 is positioned inside the insulation member 135'. In more detail, since a receiving groove 135c for receiving the terminal plate 131d is formed in the exposed surface of the insulation member 135', the terminal plate 131d can be positioned inside the insulation member 135'. In this embodiment, compared to the previous embodiment, the space of the case 120 occupied by the terminal plate 131d can be reduced, thereby increasing the amount of the electrolyte solution injected into the case 120.

In the foregoing description, the embodiment has been described with regard to a small-sized battery. However, the described technology can also be applied to a large-sized battery, such as a battery for use in an automobile, which will now be described.

Figure 5:
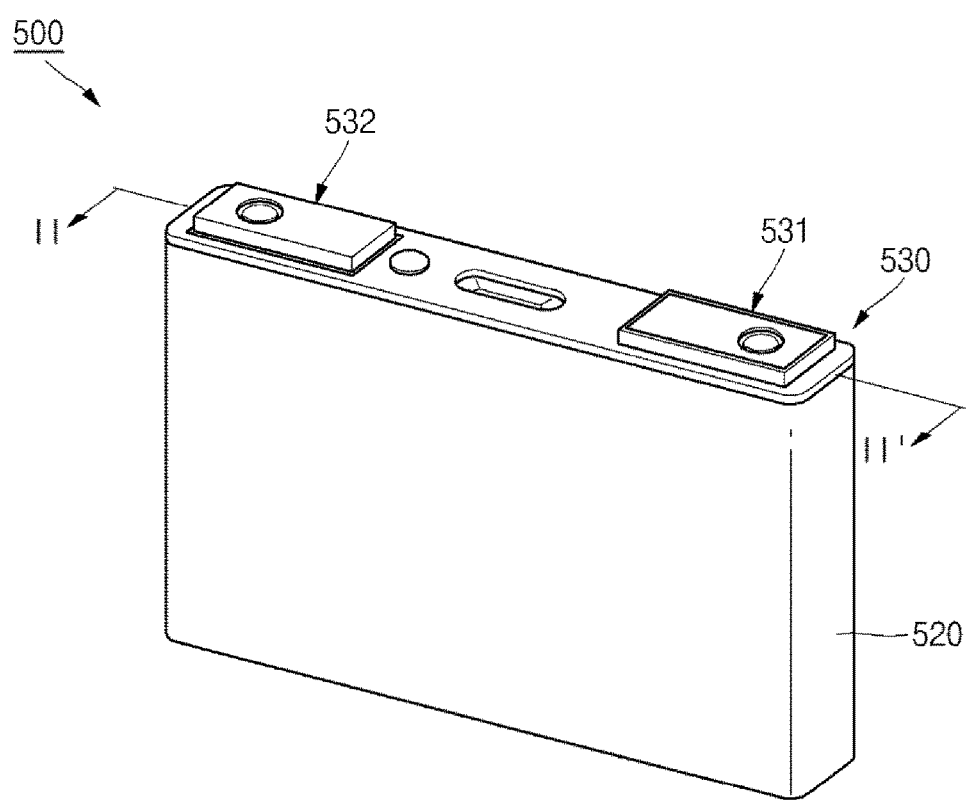
FIG. 5 is a perspective view of a secondary battery according to another embodiment.
Figure 6:
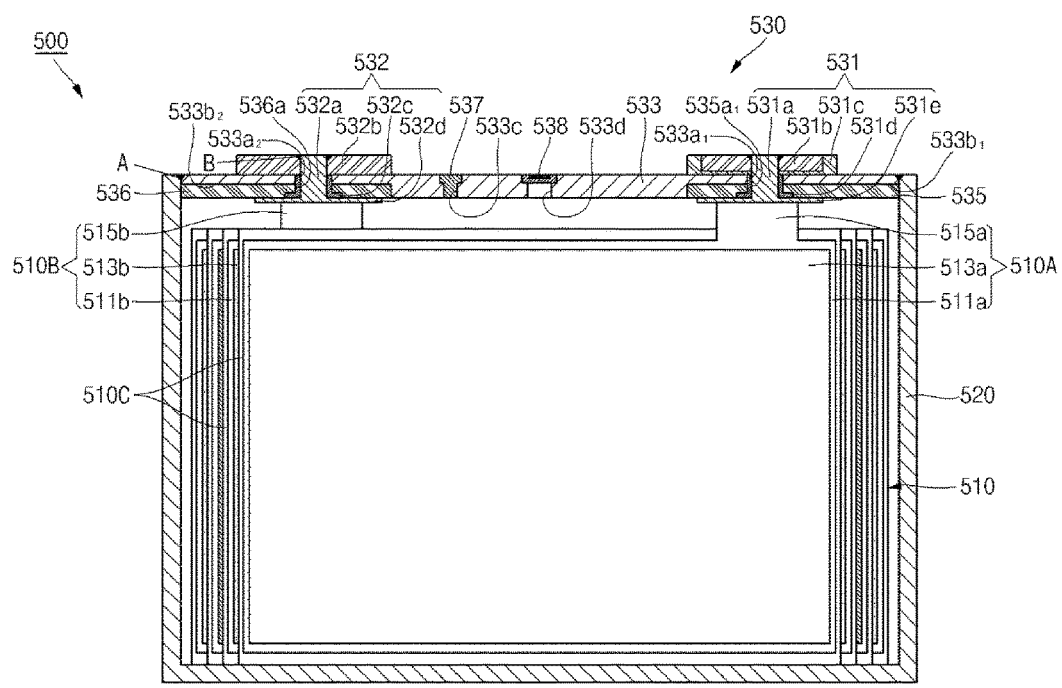
FIG. 6 is a cross-sectional view of the secondary battery, taken along the line II-II' of FIG. 5.

FIG. 5 is a perspective view of a secondary battery according to another embodiment and FIG. 6 is a cross-sectional view of the secondary battery, taken along the line II-II' of FIG. 5.

Referring to FIGS. 5 and 6, the secondary battery 500 includes an electrode assembly 510, a case 520 and a cap assembly 530.

The electrode assembly 510 includes a first electrode plate 510A, a second electrode plate 510B and a separator 510C. The first electrode plate 510A may function as a negative electrode and the second electrode plate 510B may function as a positive electrode, and vice versa.

The first electrode plate 510A includes a first electrode current collector 511a having a first electrode active material 513a coated on at least one surface thereof and a plurality of first lead tabs 515a extending from the first electrode current collector 511a. The second electrode plate 510B includes a second electrode current collector 511b having a second electrode active material 513b coated on at least one surface thereof and a plurality of second lead tabs 515b extending from the second electrode current collector 511b. The separator 510C is positioned between the first electrode plate 510A and the second electrode plate 510B to prevent electrical short circuits and to allow movement of flowable ions, such as lithium ions. The case 520 has an approximately hexahedral shape with a top opening such that the electrode assembly 510 is inserted and placed in the case 520. An electrolyte solution (not shown) and the electrode assembly 510 are accommodated in the case 520.

Since the electrode assembly 510 according to the embodiment of FIGS. 5 and 6 has the substantially same configuration as the electrode assembly 110 according to the previous embodiment, a detailed description thereof will be omitted.

The cap assembly 530 includes first and second electrode terminals 531 and 532, a cap plate 533 and first and second lower insulation members 535 and 536.

The first electrode terminal 531 includes a terminal pin 531a, an upper terminal plate 531b, an upper insulation member 531c, a seal gasket 531d and a lower terminal plate 531e.

The terminal pin 531a can be inserted into a first terminal hole 533a formed in the cap plate 533 to then be fixed to the cap plate 533 while passing through the cap plate 533 from the top portion to the bottom portion of the cap plate 533. The top portion of the terminal pin 531a is inserted into a terminal hole of the upper terminal plate 531b is welded to connect the terminal pin 531a to the upper terminal plate 531b. The upper insulation member 531c is formed to surround side and bottom portions of the upper terminal plate 531b to electrically insulate the upper terminal plate 531b from the cap plate 533.

The seal gasket 531d seals the first terminal hole 533a into which the terminal pin 531a is inserted and is formed of an electrically insulating material to electrically insulate the terminal pin 531a and the cap plate 533 from each other.

The lower terminal plate 531e is connected to a bottom end of the terminal pin 531a and may be integrally formed with the terminal pin 531a. In addition, a terminal hole is formed in the lower terminal plate 531e and the bottom end of the terminal pin 531a is riveted to the terminal hole of the lower terminal plate 531c so as to be connected to the lower terminal plate 531c.

The cap plate 533 may be a metal plate sized and shaped to correspond to the top opening of the case 520 and seals the top opening of the case 520. The cap plate 533 is connected to the case 520 such that a lateral portion of the cap plate 533 and an internal top end of the case 520 are welded to each other at a contact portion A.

The cap plate 533 includes first and second terminal holes 533a1 and 533a2, first and second coupling grooves 533b1 and 533b2, an electrolyte injection hole 533c and a vent hole 533d.

The terminal pin 531a is inserted into the first terminal hole 133a to pass through the cap plate 533 from the top and bottom portions thereof. The first coupling groove 533b1 is a space where the insulation member 535 is inserted in a slidable manner and is connected thereto. The first coupling groove 533b1 is formed such that it can be inserted from a lateral surface of the cap plate 533 to a position passing the first terminal hole 533a. In addition, like in the previous embodiment, stepped grooves (not shown) each having a predetermined depth along the first coupling groove 533b1 are formed on opposite lateral inner surfaces of the first coupling groove 533b1. Since the first coupling groove 533b1 according to the previous embodiment has substantially the same configuration as the coupling groove 133b, a detailed description thereof will be omitted.

The electrolyte injection hole 533c is formed for injecting an electrolyte solution into the case 520 and is sealed by a plug 537.

A safety vent 538 is installed in the vent hole 533d. The safety vent 538 includes a notch 381 configured to be opened when the internal pressure of the case 520 exceeds a predetermined pressure.

The first lower insulation member 535 is sized and shaped to correspond to the first coupling groove 533b1 and is inserted into the first coupling groove 533b1 in a slidable manner to be connected thereto. Since the first lower insulation member 535 according to the previous embodiment has substantially the same configuration as the insulation member 135, a detailed description thereof will be omitted.

In addition, since the second terminal hole 533b1, the second coupling hole 533b2, the second electrode terminal 532 and the second lower insulation member 536, forming the other side of the cap assembly 130, are substantially symmetrical to the first terminal hole 533a1, the first coupling hole 533a2, the first electrode terminal 531 and the first lower insulation member 535, detailed descriptions thereof will be omitted.

Figure 7:
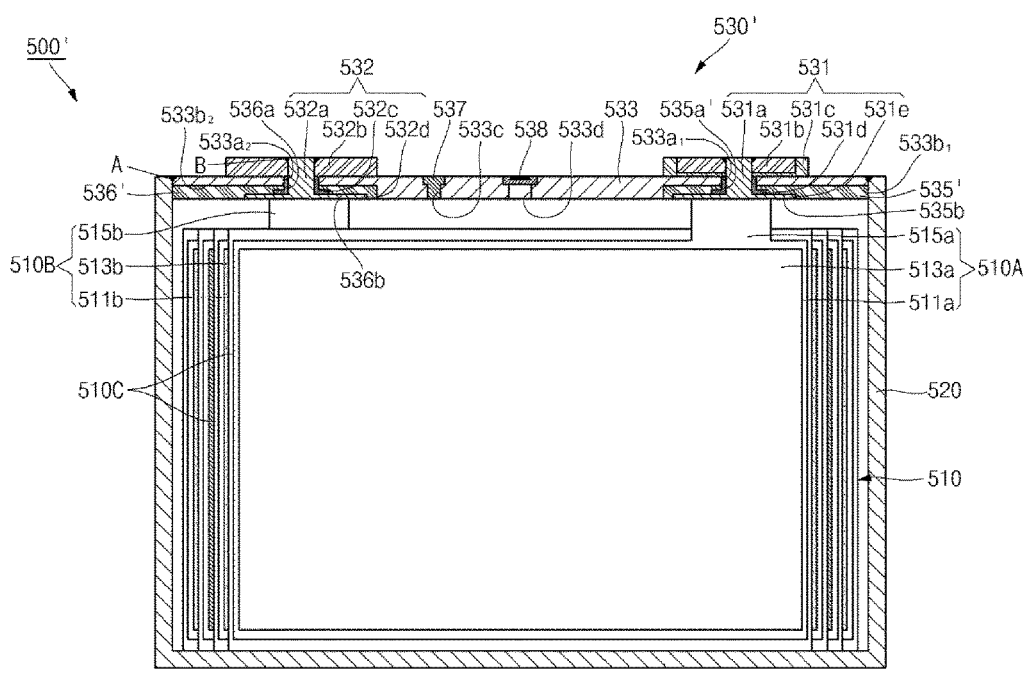
FIG. 7 is a diagram illustrating a modified example of the insulation member shown in FIG. 6.

FIG. 7 is a diagram illustrating a modified example of the insulation member shown in FIG. 6.

In a secondary battery 500' shown in FIG. 7, first and second receiving grooves 536b and 535b are formed on bottom surfaces of first and second lower insulation members 535' and 536' to receive first and second lower short-circuit plates 531e and 532d, which is similar to the insulation member 135' shown in the FIG. 4 embodiment. Since the other configurations are the same as those of the embodiment shown in FIG. 6, detailed descriptions thereof will be omitted.

Figure 8:
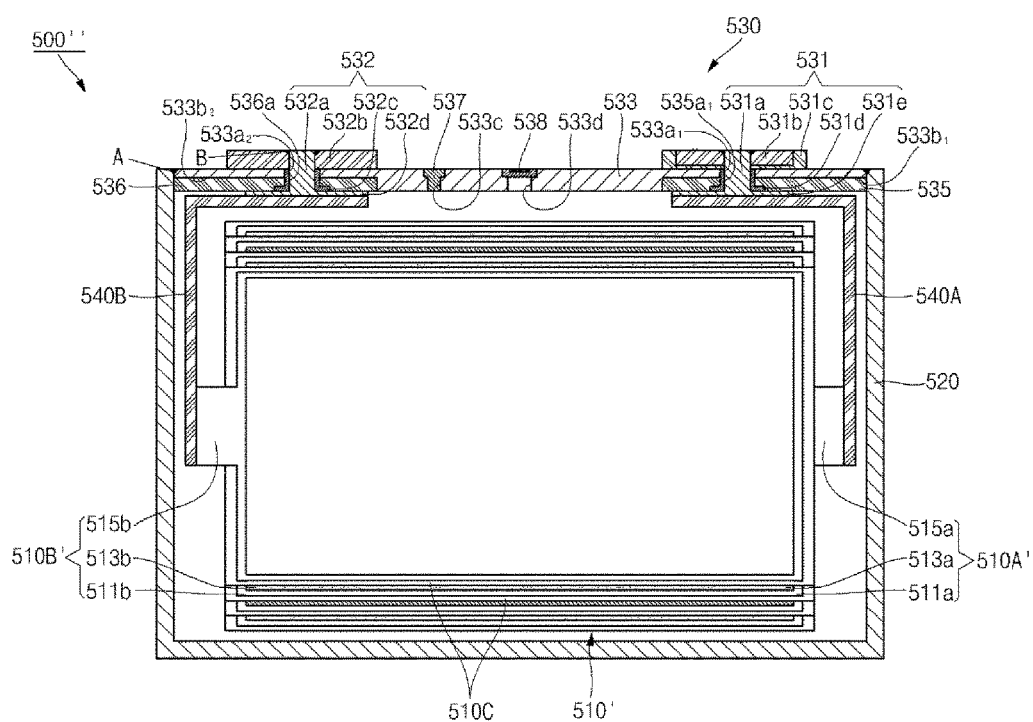
FIG. 8 is a diagram illustrating a modified example of the electrode assembly shown in FIG. 6.

FIG. 8 is a diagram illustrating a modified example of the electrode assembly shown in FIG. 6.

In a secondary battery 500" shown in FIG. 8, an electrode assembly is configured such that a winding axis thereof is parallel to a cap plate 533, compared to the electrode assembly 510 shown in FIG. 6, having a winding axis being perpendicular to the cap plate 533. Similarly, first and second lead tabs 510A' and 510B' protrude in different directions, that is, in left and right directions compared to the FIG. 6 embodiment. In addition, first and second current collectors 540A and 530B are additionally provided to respectively electrically connect the first and second lead tabs 510A' and 510B' to first and second electrode terminals 531 and 532 according to the positional changes of the first and second lead tabs 510A' and 510B'.

Figure 9:
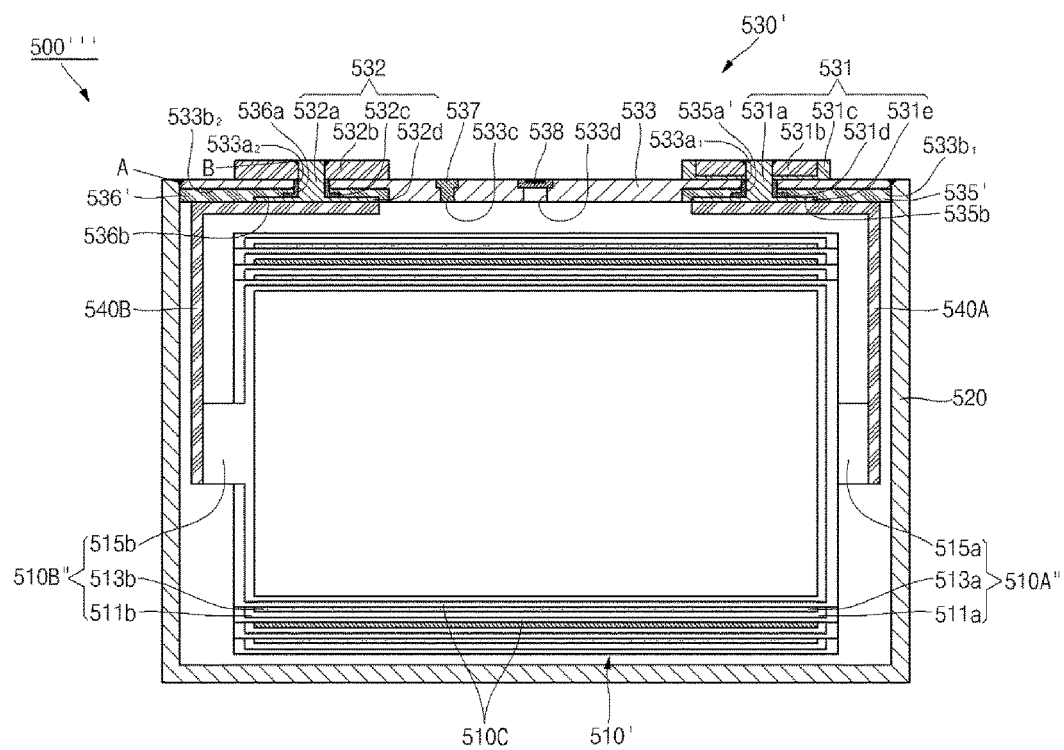
FIG. 9 is a diagram illustrating a combination example in which the cap assembly shown in FIG. 7 and the electrode assembly shown in FIG. 8 are combined with each other.

FIG. 9 is a diagram illustrating a combination example in which the cap assembly shown in FIG. 7 and the electrode assembly shown in FIG. 8 are combined with each other.

The electrode assembly 510' and the first and second current collectors 540A and 530B shown in FIG. 9 have substantially the same configurations as the electrode assembly 510' and the first and second current collectors 540A and 530B shown in FIG. 8. Similarly, the first and second lower insulation members 535' and 536' shown in FIG. 9 have substantially the same configurations as the first and second lower insulation members 535' and 536' shown in FIG. 7.

While the inventive technology has been particularly shown and described with reference to exemplary embodiments thereof, it will be understood by those of ordinary skill in the art that various changes in form and details may be made therein without departing from the spirit and scope of the invention as defined by the following claims. It is therefore desired that the present embodiments be considered in all respects as illustrative and not restrictive, reference being made to the appended claims rather than the foregoing description to indicate the scope of the invention.

What is claimed is:

1. A secondary battery, comprising:
    an electrode assembly;
    a case having an opening and housing the electrode assembly; and
    a cap assembly sealing the opening of the case, wherein the cap assembly comprises:
        an electrode terminal electrically connected to the electrode assembly;
        a cap plate including: i) a first terminal hole into which the electrode terminal is inserted and ii) a coupling groove extending from a lateral surface of the cap plate past the first terminal hole, wherein the coupling groove has an open side facing the electrode assembly; and
        an insulation member connected to the cap plate via the inside of the coupling groove and configured to be slidably engaged with the coupling groove.

2. The secondary battery of claim 1, wherein the coupling groove comprises a pair of stepped grooves formed on opposing lateral surfaces of the coupling groove.

3. The secondary battery of claim 2, wherein the insulation member comprises a pair of protrusions formed on opposing lateral surfaces of the insulation member and wherein the protrusions are configured to be inserted into the stepped grooves.

4. The secondary battery of claim 2, wherein the insulation member is accommodated within the cap plate inside a gap formed between the pair of stepped grooves.

5. The secondary battery of claim 1, wherein the insulating member comprises a second terminal hole which corresponds to the first terminal hole and into which the electrode terminal is inserted.

6. The secondary battery of claim 1, wherein the electrode terminal comprises:
    a terminal pin inserted into the first terminal hole; and
    a terminal plate connected to one end of the terminal pin and electrically connected to the electrode assembly.

7. The secondary battery of claim 6, wherein the terminal plate is positioned outside the insulation member.

8. The secondary battery of claim 6, wherein the insulation member includes a receiving groove corresponding to the terminal plate and wherein the terminal plate is inserted into the receiving groove so as to be positioned inside the insulation member.

9. The secondary battery of claim 1, wherein a lateral portion of the cap plate and an internal top end of the case are welded to each other.

10. The secondary battery of claim 1, wherein the electrode assembly comprises:
    a first electrode plate including: i) a first electrode current collector having a first electrode active material coated on at least one surface thereof and ii) a plurality of first lead tabs extending from the first electrode current collector and protruding toward the cap assembly;
    a second electrode plate including: i) a second electrode current collector having a second electrode active material coated on at least one surface thereof and ii) a plurality of second lead tabs extending from the second electrode current collector and protruding toward the cap assembly; and
    a separator interposed between the first electrode plate and the second electrode plate,
    wherein at least one of the first lead tabs and the second lead tabs are electrically connected to the electrode terminal.

11. The secondary battery of claim 1, wherein the insulation member is interposed between a top surface of the cap plate and the electrode assembly.

\* \* \* \* \*